SYNCHRONIZED SYSTEM OF OSCILLATOR DRIVERS

Filed Nov. 8, 1960 2 Sheets-Sheet 1

INVENTOR
GENUNG L. CLAPPER

BY G. R. Gugger
AGENT

June 5, 1962 G. L. CLAPPER 3,038,129

SYNCHRONIZED SYSTEM OF OSCILLATOR DRIVERS

Filed Nov. 8, 1960 2 Sheets-Sheet 2

United States Patent Office 3,038,129
Patented June 5, 1962

3,038,129
SYNCHRONIZED SYSTEM OF OSCILLATOR DRIVERS

Genung L. Clapper, Vestal, N.Y., assignor to International Business Machines Corporation, New York, N.Y., a corporation of New York
Filed Nov. 8, 1960, Ser. No. 68,011
7 Claims. (Cl. 331—117)

This invention relates to a system of oscillator drivers and more particularly to a system wherein each oscillator driver is synchronized to a master oscillator by very small signals on low impedance lines.

Data processing systems handle information in digital form and a vital part of such a system is the distribution of the clock or synchronizing pulses. As the frequency of operation increases, the necessity for accurately timed pulses increases while the power requirements and transmission problems are very severe.

In the present improved system, use is made of a push-pull oscillator driver as the basic driver unit. This unit drives a small block of logic devices so that all connections are as short as possible. Each oscillator driver is synchronized to a master oscillator by very small signals on low impedance lines and several master oscillators may, in turn, be synchronized by a single "source oscillator." Since all of the synchronizing pulses are small signals, in the order of plus or minus 0.5 volt, the problem of transmission is simplified, power requirements are low and radiation of the clock pulse is greatly reduced. Another important feature of the present system is that the usual synchronizing sine wave is changed to a square wave and differentiated. Both the differentiated positive and negative pulses are transmitted to synchronize the oscillators both on and off thereby producing a highly accurate system.

Accordingly, a principal object of the present invention is to provide an improved synchronizing system wherein each oscillator driver is synchronized to a master oscillator by very small signals on low impedance lines.

A further object of the present invention is to provide an improved synchronizing system which makes use of a push-pull oscillator driver as the basic driver unit for driving a small block of logic devices.

A still further object of the present invention is to provide an improved synchronizing system wherein the synchronizing sine wave is changed to a square wave and differentiated with both the differentiated positive and negative pulses being transmitted to synchronize the oscillators both on and off.

The foregoing and other objects, features and advantages of the invention will be apparent from the following more particular description of a preferred embodiment of the invention, as illustrated in the accompanying drawings.

Figure 1:
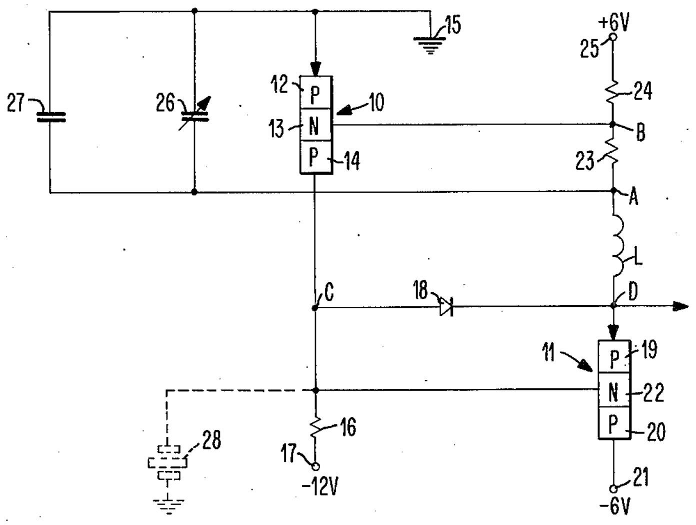
FIG. 1 is a circuit diagram of a basic push-pull oscillator embodying the principles of the present invention.

Referring to FIG. 1, the basic push-pull oscillator circuit comprises a pair of transistors 10 and 11 connected in a push-pull inverter configuration. The transistor 10 includes an emitter electrode 12, a base electrode 13 and a collector electrode 14, with the emitter electrode connected to a suitable source of ground potential 15 and the collector electrode connected through a load resistor 16 to a negative 12 volt terminal 17.

The transistor 10 functions as a current driver and its collector electrode is connected through junction point C to one side of an AA diode 18. The other side of diode 18 is connected through the junction point D to the emitter electrode 19 of transistor 11. Transistor 11 has an emitter follower configuration with the collector electrode 20 connected to a negative 6 volt terminal 21 and the base electrode 22 connected back to the resistor 16 and negative 12 volt terminal 17. The emitter circuit for the transistor 11 includes an inductor L, a voltage divider comprising the resistors 23 and 24, and a positive 6 volt terminal 25. The tank circuit for the oscillator comprises the inductor L connected through the junction point A to a variable trimmer capacitor 26 and a fixed capacitor 27, the fixed capacitor serving to increase the total capacitance of the circuit and the variable trimmer being used to tune the oscillator to any desired frequency. The inductor L is used to feed back the output pulse through junction point B to the base input of the push-pull inverter.

The AA diode 18, connected from the input to the output, acts as a current sensing control for the PNP emitter follower transistor 11. With no input current from the driver transistor 10, the diode is polarized in a reversed direction. Current flows through the forward biased emitter-base diode of the emitter follower transistor and the transistor conducts strongly to clamp the output line to negative 6 volts. An input current of over 2 milliamperes raises the base above the emitter which reverse biases the transistor emiter-base diode, cutting it off. Only a few microamperes are necessary in the AA diode to produce a drop sufficient to cut off the transistor. Thus, in the absence of any other load, the $I_{co}$ of the emitter-follower would cause sufficient drop to keep it cut off. If the load is heavy, however, the drop increases only a few tenths of a volt and heavy currents may be passed from the driver to the load. As soon as the driver cuts off, the input current ceases, the diode reverse biases and assumes a high impedance, and the emitter-base diode of the transistor 11 conducts. This causes the transistor 11 to assume a very low impedance of possibly 30 ohms. While driving on, the driver saw the resistor 16 load, which may be in the order of 1.5 kilohms, exclusive of the external load. This suddenly changes to a very low resistance when the driver cuts off and the AA diode ceases to conduct in a forward direction. Thus, the AA diode switches positive drive current to the load and cuts off the transistor 11 negative current while driving the line up, and permits the transistor to conduct negative current from the load when forward current ceases to flow from the driver.

A feature of the present oscillator circuit is that no matter how the power is turned on, the circuit will always start into regular oscillation. With all power off, the reference point D will be substantially at ground potential and both transistors will be cut off. Now, for example, if both the positive and negative voltages are turned on, the potential at point B will rise to increase the cutoff of transistor 10. This will drop the potential at point C sufficiently to switch transistor 11 on. Current flows from the positive 6 volt terminal 25 through the inductor L and the transistor to the negative 6 volt terminal 21 and the potential at point D will drop and hold at negative 6 volts. The potential at point A rises with point B building up voltage across the inductor. The negative transient at point D will be reflected at point A 180 degrees later when the changing field of the inductor reaches its maximum and stops. The voltage across the inductor will now drop and the potential at points A and B will drop. The potential at B will drop sufficiently to switch transistor 10 into conduction and current will flow from the ground terminal 15, through the transistor, point C, and resistor 16 to the negative 12 volt terminal 17. The potential at point C now rises and the transistor 11 goes to cutoff. The potential at point D of the emitter follower will normally follow the potential at point C and in the presence of an external load, for example, a capacitive load, current will flow from point C through the diode 18 to the load to drive the potential at point D up. When the potential at point D rises, the positive transient is not immediately reflected through the inductor L. However, 180 degrees later in the cycle the transient is coupled through the inductor and the potential at point A rises. The potential at point B will also rise sufficiently to cut off the transistor 10 which results in a drop in potential at point C and the switching of the emitter follows transistor back into conduction to complete a full cycle of oscillation.

Figure 2:
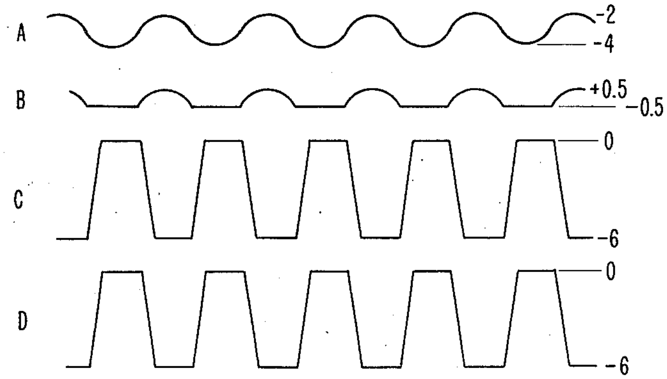
FIG. 2 is a diagram of wave forms which illustrate the operation of the circuit shown in FIG. 1.

The cycle above described repeats and, as shown in FIG. 2, the square wave output is 180 degrees out of phase with the sinusoidal input. Since an inversion is equivalent to a 180° phase reversal, the total phase shift around the loop is 360° and the fundamental condition for oscillation is satisfied. The circuit cannot lock up and it will be noted that it has a full swing immediately upon starting. A suitable crystal 28 may be employed as shown in dotted lines, to make the oscillator a source of fixed frequency whereby it may function as a master oscillator.

Figure 3:
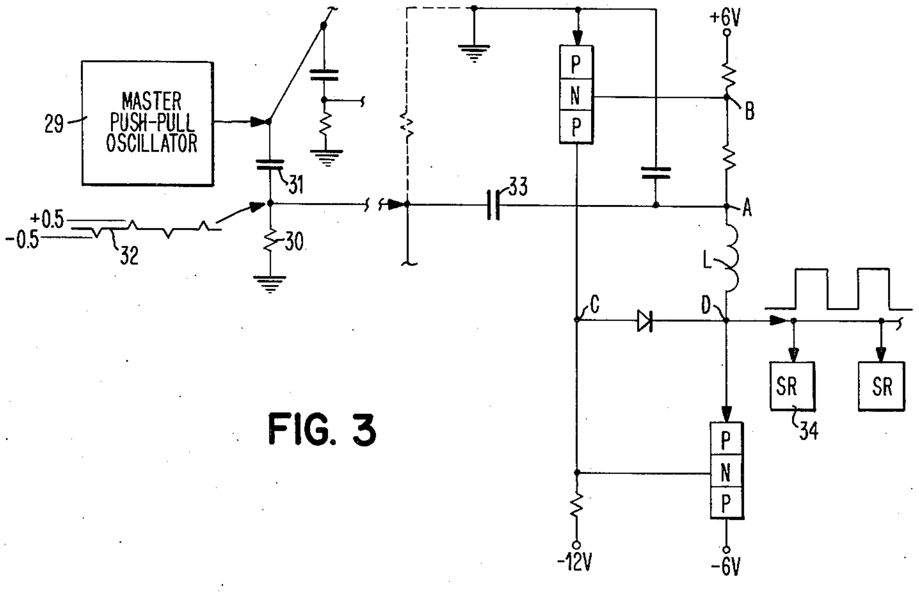
FIG. 3 is a circuit diagram of a basic synchronized oscillator driver embodying the principles of the present invention.

Referring to FIG. 3, the master oscillator 29, which takes the form of the circuit shown in FIG. 1, may now be used to synchronize other oscillator drivers. The square wave output from the master oscillator is differentiated by the RC circuit comprising the resistor 30 and capacitor 31. The differentiated waveform 32 is applied through a synchronizing capacitor 33 to the mid-point of the LC tank circuit. The oscillator driver circuit operates in the same manner as the one described above in connection with FIG. 1. Without the synchronized pulse input from the master oscillator, it will run slightly slower than the desired 5.0 megacycles. However, the synchronized pulses will bring the frequency up to the desired frequency. It will be noted that both the differentiated positive and negative pulses are transmitted to synchronize the oscillator. When the potential at point D is on the rise, the positive differentiated pulse will speed up the action to synchronize the leading edge of the output pulse and when the potential at point D is dropping, the negative differentiated pulse will speed up this action to synchonize the trailing edge of the output pulse. The output pulses, for example, may be used to drive a plurality of shift registers 34.

Figure 4:
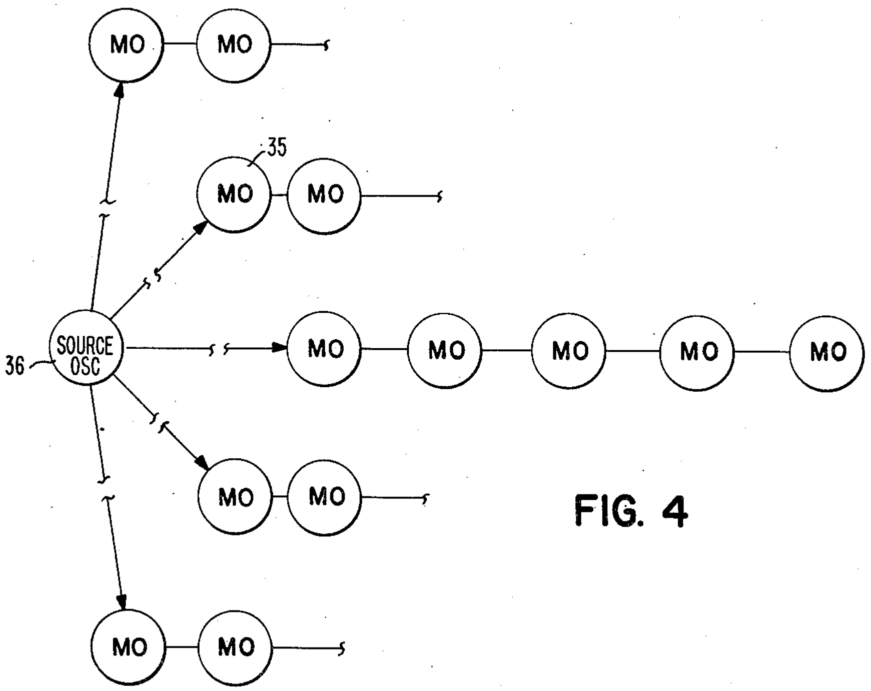
FIG. 4 is a circuit diagram showing a synchronized system of oscillator drivers.

As shown in FIG. 4, a number of master oscillators 35 may be synchronized with one source oscillator 36 using the present low voltage differentiated sync pulse technique. And each of the master oscillators may in turn synchronize a number of oscillator drivers. The output of each oscillator driver is a full 6 volt pulse and is coupled to the logic units as directly as possible. As many as 10,000 shift register units may be driven from one source oscillator. All of the synchronizing lines are low impedance with small signals.

While the invention has been particularly shown and described with reference to a preferred embodiment thereof, it will be understood by those skilled in the art that various changes in form and details may be made therein without departing from the spirit and scope of the invention.

What is claimed is:

1. An oscillator driver circuit for producing square wave synchronizing output pulses in response to a sinusoidal input waveform which comprises, a first transistor having emitter, base and collector electrodes and arranged as an emitter follower, a second transistor having emitter, base and collector electrodes and arranged as an inverter driver for supplying current to the base electrode of said emitter follower, a diode connecting the collector electrode of said inverter driver with the emitter electrode of said emitter follower, said transistors operating as a push-pull inverter circuit, a tank circuit including a capacitance and an inductance with said inductance being connected in series between the emitter of said emitter follower and the base of said inverter driver to feed back the output pulses from said emitter follower to the input of said push-pull inverter circuit, and a source of potential for starting said driver circuit into oscillation.

2. An oscillator driver circuit as defined in claim 1 and including a crystal in circuit with the base electrode of said emitter follower for making said oscillator driver a source of fixed frequency.

3. An oscillator driver circuit for producing square wave synchronizing output pulses in response to a sinusoidal input waveform which comprises, a pair of transistors of like characteristics, one of said transistors having emitter, base and collector electrodes and arranged as an emitter follower, the other of said transistors having emitter, base and collector electrodes and arranged as an inverter driver for supplying current to the base electrode of said emitter follower, a diode connecting the collector electrode of said inverter driver with the emitter electrode of said emitter follower, said transistors operating as a push-pull inverter circuit, a tank circuit including a capacitance and an inductance with said inductance being connected in series between the emitter of said emitter follower and the base of said inverter driver, and biasing potentials for said transistors effective to first place said emitter follower in conduction to start a cycle of oscillation, said emitter follower producing a square wave output pulse at its emitter electrode, and said inductance being effective 180 degrees later in the cycle to reflect said square wave output pulse as a sinusoidal wave at the base electrode of said inverter driver whereby said inverter driver transistor is switched into conduction and said emitter follower is switched out of conduction.

4. An oscillator driver circuit as defined in claim 3 and including a crystal connected in common with the collector electrode of said inverter driver and the base electrode of said emitter follower for effecting switching of said transistors on a fixed frequency.

5. A system for synchronizing a plurality of oscillator drivers which comprises in combination, a master oscillator having a pair of transistors of like characteristics and arranged in a push-pull inverter circuit configuration, a tank circuit including a capacitance and inductance in circuit between said transistors, biasing potentials for said transistors effective to operate said push-pull inverter circuit to place said tank circuit in sustained oscillation whereby said push-pull inverter circuit will produce a series of square wave output pulses, crystal means in circuit with said transistors for providing a fixed frequency of oscillation, at least one differentiating circuit responsive to said square wave output pulses for producing a series of differentiated positive and negative pulses, and means for coupling said differentiated positive and negative pulses to at least one related oscillator driver for synchronizing both the "turn on" and "turn off" of said oscillator driver with said master oscillator.

6. A system for synchronizing a plurality of oscillator drivers as defined in claim 5 wherein each oscillator driver includes an L-C tank circuit, and said coupling means comprises a synchronizing capacitor connected between the output of said differentiating circuit and the midpoint of the tank circuit of said oscillator driver.

7. A system for synchronizing a remote push-pull oscillator driver which comprises in combination, a master oscillator having a pair of transistors of like characteristics, one of said transistors having emitter, base and collector electrodes and arranged as an emitter follower, the other of said transistors having emitter, base and collector electrodes and arranged as an inverter driver for supplying current to the base electrode of said emitter follower, a diode connecting the collector electrode of said inverter driver with the emitter electrode of said emitter follower, said transistors operating as a push-pull inverter circuit, a tank circuit including a capacitance and an inducance with said inductance being connected in series between the emitter of said emitter follower and the base of said inverter driver, biasing potentials for said transistors effective to place said emitter follower in conduction to start a cycle of oscillation, said emitter follower producing the leading edge of a square wave output pulse at its emitter electrode, and said inductance being effective 180 degrees later in the cycle to reflect said leading pulse edge as a sinusoidal wave at the base electrode of said inverter driver whereby said inverter driver transistor is switched into conduction and said emitter follower is switched out of conduction whereupon the trailing edge of said square wave output pulse is produced at the emitter electrode of said emitter follower, crystal means in circuit with said transistors for providing a fixed frequency of oscillation, an R-C differentiating circuit connected to the emitter electrode of said emitter follower for producing differentiated pulses at the leading and trailing edges of said square wave output pulse, and a synchronizing capacitor for coupling said differentiated pulses to said remote oscillator driver to synchronize both "turn on" and "turn off" of said remote driver.

References Cited in the file of this patent

UNITED STATES PATENTS

| | | |
|---|---|---|
| 2,343,099 | Usselman | Feb. 29, 1944 |
| 2,411,565 | Wilson | Nov. 26, 1946 |
| 2,940,052 | Van Winkle | June 7, 1960 |